United States Patent
Liu

(10) Patent No.: US 6,373,196 B2
(45) Date of Patent: Apr. 16, 2002

(54) MULTIPLEXED LAMP ASSEMBLY

(75) Inventor: Ching-Chung Liu, Hsinchu (TW)

(73) Assignee: Olivia Rouh-Huey Liu Sheng, Tucson, AZ (US)

( * ) Notice: Subject to any disclaimer, the term of this patent is extended or adjusted under 35 U.S.C. 154(b) by 0 days.

(21) Appl. No.: 09/758,199

(22) Filed: Jan. 12, 2001

(30) Foreign Application Priority Data

Jan. 20, 2000 (TW) ..................................... 89200995 U

(51) Int. Cl.$^7$ .............................................. H05B 41/30
(52) U.S. Cl. .................... 315/185 S; 315/312; 362/800
(58) Field of Search ...................... 315/185 S, 185 R, 315/200 A, 252, 362, 312–324; 362/800

(56) References Cited

U.S. PATENT DOCUMENTS

| | | | | |
|---|---|---|---|---|
| 5,027,037 A | * | 6/1991 | Wei | 315/185 S |
| 5,111,113 A | * | 5/1992 | Chu | 315/210 |
| 5,192,895 A | * | 3/1993 | Chang | 315/312 |

* cited by examiner

Primary Examiner—Don Wong
Assistant Examiner—Wilson Lee
(74) Attorney, Agent, or Firm—Sughrue Mion, PLLC

(57) ABSTRACT

A multiplexed lamp assembly is adapted to be coupled to a source of an alternating current signal, and includes a control unit, and first, second, third and fourth lamp units. The control unit has an input side adapted to be coupled to the source, and an output side with a control line unit. The control unit receives the alternating current signal, and is operable so as to generate first, second, third and fourth control signals at the control line unit. Each of the first, second, third and fourth control signals is generated during a respective one of first, second, third and fourth quadrants of a cycle of the alternating current signal. The first, second, third and fourth lamp units are coupled to the control line unit and are adapted to be coupled to the source. Each of the first, second, third and fourth lamp units is activated by a respective one of the first, second, third and fourth control signals so as to allow current flow from the source therethrough and emit light during a respective one of the first, second, third and fourth quadrants of the alternating current signal.

9 Claims, 4 Drawing Sheets

MULTIPLEXED LAMP ASSEMBLY

BACKGROUND OF THE INVENTION

1. Field of the Invention

The invention relates to a multiplexed lamp assembly, more particularly to a multiplexed lamp assembly that requires a lower amount of wire material to fabricate the same.

2. Description of the Related Art

Referring to FIG. 1, a conventional four circuit lamp assembly is coupled to a source 1 of an alternating current signal, and includes a controller 2 coupled to the source 1 for receiving the alternating current signal so as to generate four control signals at four control bus lines thereof, respectively, a resistor (R0) coupled across the source 1 and the controller 2, and four incandescent lamps 3, 4, 5, 6. Each of the incandescent lamps 3, 4, 5, 6 is coupled across the source 1 and a respective one of the control bus lines of the controller 2, and is activated by a respective one of the control signals so as to emit light.

FIG. 2 illustrates another conventional four circuit lamp assembly. Unlike the aforesaid conventional four circuit lamp assembly of FIG. 1, each of the incandescent lamps 3, 4, 5, 6 is in a series connection that is coupled across the source and a respective one of the control bus lines of the controller 2.

In the above-mentioned conventional four circuit lamp assemblies, four control bus lines are needed to transmit the control signals generated by the controller 2.

SUMMARY OF THE INVENTION

Therefore, the main object of the present invention is to provide a multiplexed lamp assembly that requires a lower amount of wire material to fabricate the same.

According to the present invention, a multiplexed lamp assembly is adapted to be coupled to a source of an alternating current signal, and includes a control unit, and first, second, third and fourth lamp units.

The control unit has an input side adapted to be coupled to the source, and an output side with a control line unit. The control unit receives the alternating current signal, and is operable so as to generate first, second, third and fourth control signals at the control line unit. Each of the first, second, third and fourth control signals is generated during a respective one of first, second, third and fourth quadrants of a cycle of the alternating current signal.

The first, second, third and fourth lamp units are coupled to the control line unit and are adapted to be coupled to the source. Each of the first, second, third and fourth lamp units is activated by a respective one of the first, second, third and fourth control signals so as to allow current flow from the source therethrough and emit light during a respective one of the first, second, third and fourth quadrants of the alternating current signal.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
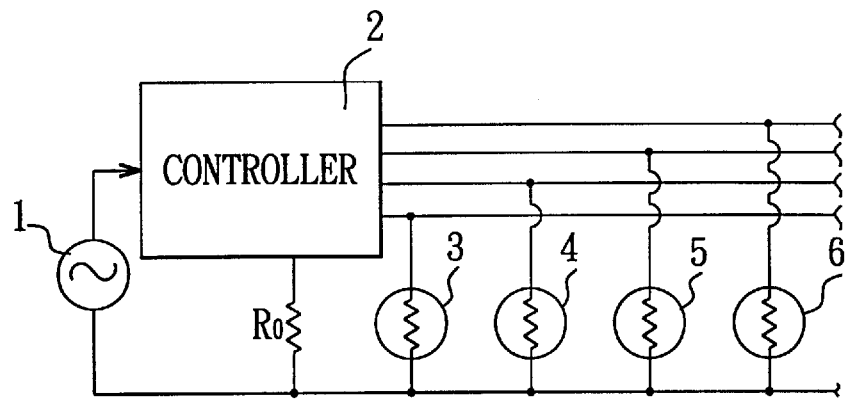
FIG. 1 is a schematic electrical circuit diagram illustrating a conventional four circuit lamp assembly.
Figure 2:
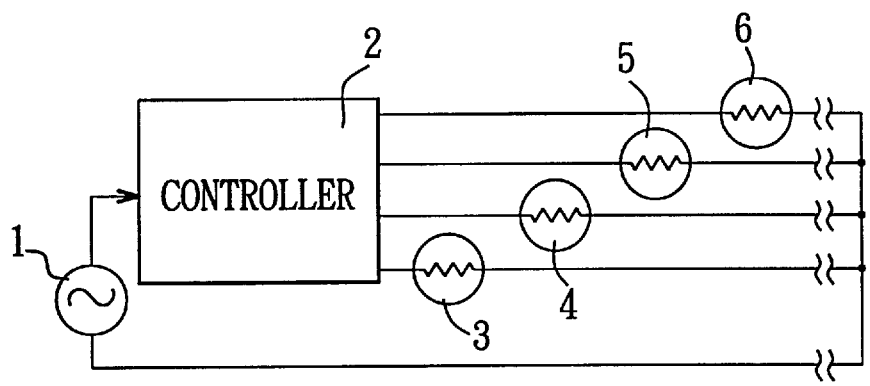
FIG. 2 is a schematic electrical circuit diagram illustrating another conventional four circuit lamp assembly.

Before the present invention is described in greater detail, it should be noted that like elements are denoted by the same reference numerals throughout the disclosure.

Figure 3:
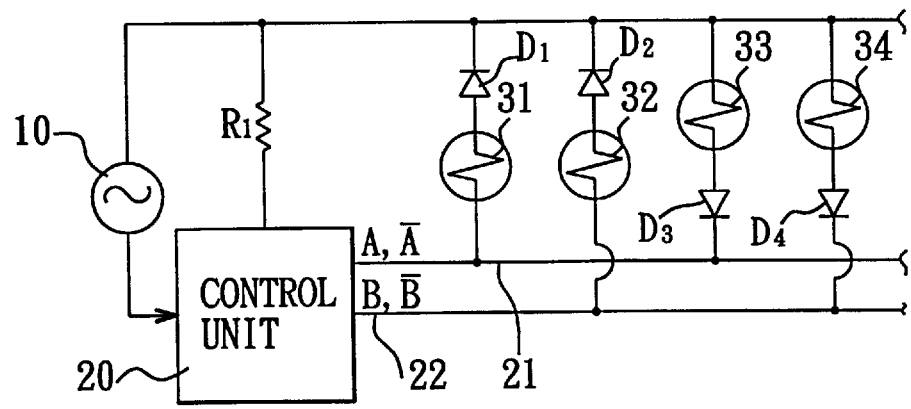
FIG. 3 is a schematic electrical circuit diagram illustrating the first preferred embodiment of a multiplexed lamp assembly according to this invention.
Figure 4A:
FIGS. 4a to 4d are signal diagrams showing first, second, third and fourth control signals, respectively, which are generated by a control unit of the first preferred embodiment according to an alternating current signal from a source.
Figure 4B:
Figure 4C:
Figure 4D:

Referring to FIG. 3, according to the first preferred embodiment of this invention, a multiplexed lamp assembly is adapted to be coupled to a source 10 of an alternating current signal. The multiplexed lamp assembly includes a control unit 20, first, second, third and fourth lamp units, and a resistor (R1) adapted to be coupled across the source 10 and the control unit 20.

The control unit 20 has an input side adapted to be coupled to the source 10, and an output side with a control line unit. The control unit 20 receives the alternating current signal, and is operable so as to generate first, second, third and fourth control signals (A, B, $\overline{A}$, $\overline{B}$) at the control line unit. Referring to FIGS. 4a to 4d, each of the first, second, third and fourth control signals (A, B, $\overline{A}$, $\overline{B}$) is generated during a respective one of first, second, third and fourth quadrants of a cycle of the alternating current signal. The first and third quadrants are non-consecutive, and the first and third control signals (A, $\overline{A}$) have opposite polarities. The second and fourth quadrants are similarly non-consecutive, and the second and fourth control signals (B, $\overline{B}$) have opposite polarities. In this embodiment, the control line unit includes first and second bus lines 21, 22. The control unit 20 outputs the first and third control signals (A, $\overline{A}$) at the first bus line 21, and further outputs the second and fourth control signals (B, $\overline{B}$) at the second bus line 22.

The first, second, third and fourth lamp units are coupled to the control line unit, and are adapted to be coupled to the source 10. Each of the first, second, third and fourth lamp units is activated by a respective one of the first, second, third and fourth control signals (A, B, $\overline{A}$, $\overline{B}$) so as to allow current flow from the source 10 therethrough and emit light during a respective one of the first, second, third and fourth quadrants of the alternating current signal. In this embodiment, each of the first and third lamp units is adapted to be coupled across the source 10 and the first bus line 21. Each of the second and fourth lamp units is adapted to be coupled across the source 10 and the second bus line 22. The first lamp unit includes a series connection of a first incandescent lamp 31, which has a first terminal coupled to the first bus line 21, and a second terminal, and a first diode (D1), which has an anode coupled to the second terminal of the first incandescent lamp 31, and a cathode adapted to be coupled to the source 10 such that the first incandescent lamp 31 emits light when the control unit 20 generates the first control signal (A) at the first bus line 21 during the first quadrant of a cycle of the alternating current signal. The second lamp unit includes a series connection of a second incandescent lamp 32, which has a first terminal coupled to the second bus line 22, and a second terminal, and a second diode (D2), which has an anode coupled to the second terminal of the second incandescent lamp 32, and a cathode adapted to be coupled to the source 10 such that the second incandescent lamp 32 emits light when the control unit 20 generates the second control signal (B) at the second bus line 22 during the second quadrant of a cycle of the alternating current signal. The third lamp unit includes a series connection of a third incandescent lamp 33, which has a first terminal, and a second terminal adapted to be coupled to the source 10, and a third diode (D3), which has an anode coupled to the first terminal of the third incandescent lamp 33, and a cathode coupled to the first bus line 21 such that the third incandescent lamp 33 emits light when the control unit 20 generates the third control signal ($\overline{A}$) at the first bus line 21 during the third quadrant of a cycle of the alternating current signal. The fourth lamp unit includes a series connection of a fourth incandescent lamp 34, which has a first terminal, and a second terminal adapted to be coupled to the source 10, and a fourth diode (D4), which has an anode coupled to the first terminal of the fourth incandescent lamp 34, and a cathode coupled to the second bus line 22 such that the fourth incandescent lamp 34 emits light when the control unit 20 generates the fourth control signal ($\overline{B}$) at the second bus line 22 during the fourth quadrant of a cycle of the alternating current signal.

Figure 5:
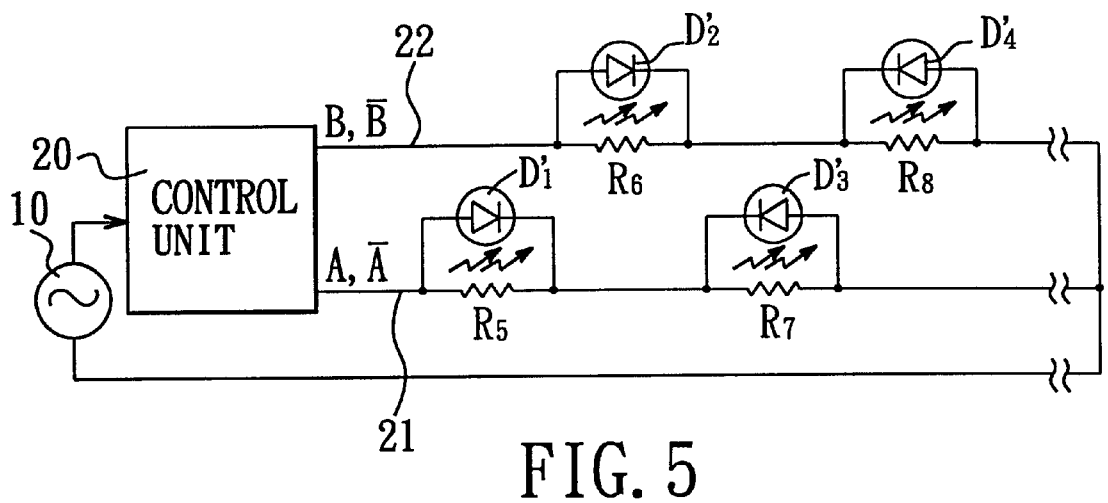
FIG. 5 is a schematic electrical circuit diagram illustrating the second preferred embodiment of this invention.

FIG. 5 illustrates the second preferred embodiment of a multiplexed lamp assembly according to this invention. Unlike the first preferred embodiment of FIG. 3, the first and third lamp units are in a first series connection that is adapted to be coupled across the source 10 and the first bus line 21, and the second and fourth lamp units are in a second series connection that is adapted to be coupled across the source 10 and the second bus line 22.

In this embodiment, the first lamp unit includes a parallel connection of a first light emitting diode (D1') and a first resistor (R5). The second lamp unit includes a parallel connection of a second light emitting diode (D2') and a second resistor (R6). The third lamp unit includes a parallel connection of a third light emitting diode (D3') and a third resistor (R7). The third light emitting diode (D3') is connected in the third lamp unit with a polarity opposite to that of the first light emitting diode (D1') in the first lamp unit. Cathodes of the first and third light emitting diodes (D1', D3') are then coupled to each other. The fourth lamp unit includes a parallel connection of a fourth light emitting diode (D4') and a fourth resistor (R8). The fourth light emitting diode (D4') is connected in the fourth lamp unit with a polarity opposite to that of the second light emitting diode (D2') in the second lamp unit. Cathodes of the second and fourth light emitting diodes (D2', D4') are then coupled to each other. As such, the first light emitting diode (D1') emits light when the control unit 20 generates the first control signal (A) at the first bus line 21 during the first quadrant of a cycle of the alternating current signal. The second light emitting diode (D2') emits light when the control unit 20 generates the second control signal (B) at the second bus line 22 during the second quadrant of a cycle of the alternating current signal. The third light emitting diode (D3') emits light when the control unit 20 generates the third control signal ($\overline{A}$) at the first bus line 21 during the third quadrant of a cycle of the alternating current signal. The fourth light emitting diode (D4') emits light when the control unit 20 generates the fourth control signal ($\overline{B}$) at the second bus line 22 during the fourth quadrant of a cycle of the alternating current signal.

Figure 6:
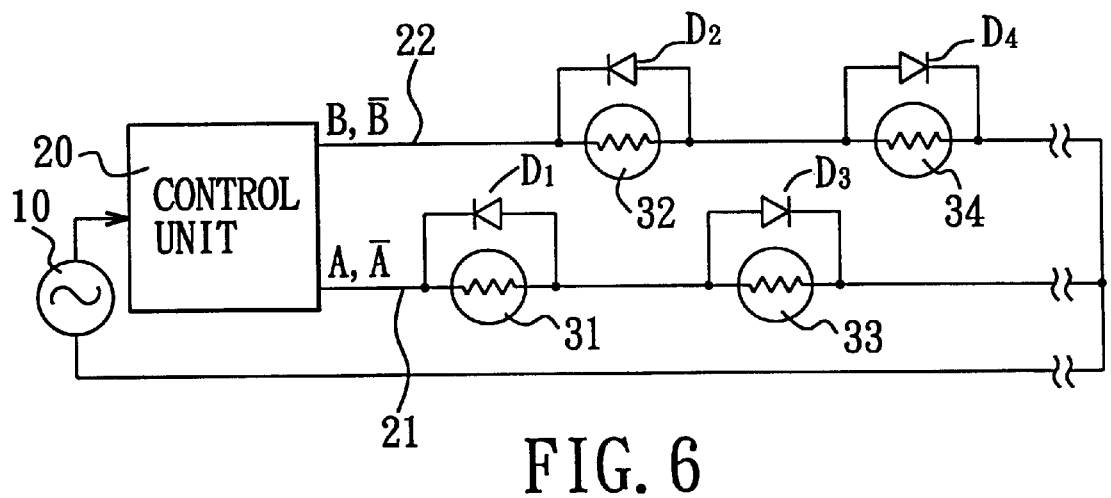
FIG. 6 is a schematic electrical circuit diagram illustrating the third preferred embodiment of this invention.

FIG. 6 illustrates the third preferred embodiment of a multiplexed lamp assembly according to this invention. Unlike the second preferred embodiment of FIG. 5, the first lamp unit includes a parallel connection of the first incandescent lamp 31 and the first diode (D1). The second lamp unit includes a parallel connection of the second incandescent lamp 32 and the second diode (D2). The third lamp unit includes a parallel connection of the third incandescent lamp 33 and the third diode (D3). The third diode (D3) is connected to the third incandescent lamp 33 with a polarity opposite to that of the first diode (D1) in the first lamp unit. The anodes of the first and third diodes (D1, D3) are then coupled to each other. The fourth lamp unit includes a parallel connection of the fourth incandescent lamp 34 and the fourth diode (D4) The fourth diode (D4) is connected to the fourth incandescent lamp 34 with a polarity opposite to that of the second diode (D2) in the second lamp unit. The anodes of the second and fourth diodes (D2, D4) are then coupled to each other. As such, the first incandescent lamp 31 emits light when the control unit 20 generates the first control signal (A) at the first bus line 21 during the first quadrant of a cycle of the alternating current signal. The second incandescent lamp 32 emits light when the control unit 20 generates the second control signal (B) at the second bus line 22 during the second quadrant of a cycle of the alternating current signal. The third incandescent lamp 33 emits light when the control unit 20 generates the third control signal ($\overline{A}$) at the first bus line 21 during the third quadrant of a cycle of the alternating current signal. The fourth incandescent lamp 34 emits light when the control unit 20 generates the fourth control signal ($\overline{B}$) at the second bus line 22 during the fourth quadrant of a cycle of the alternating current signal.

Figure 7:
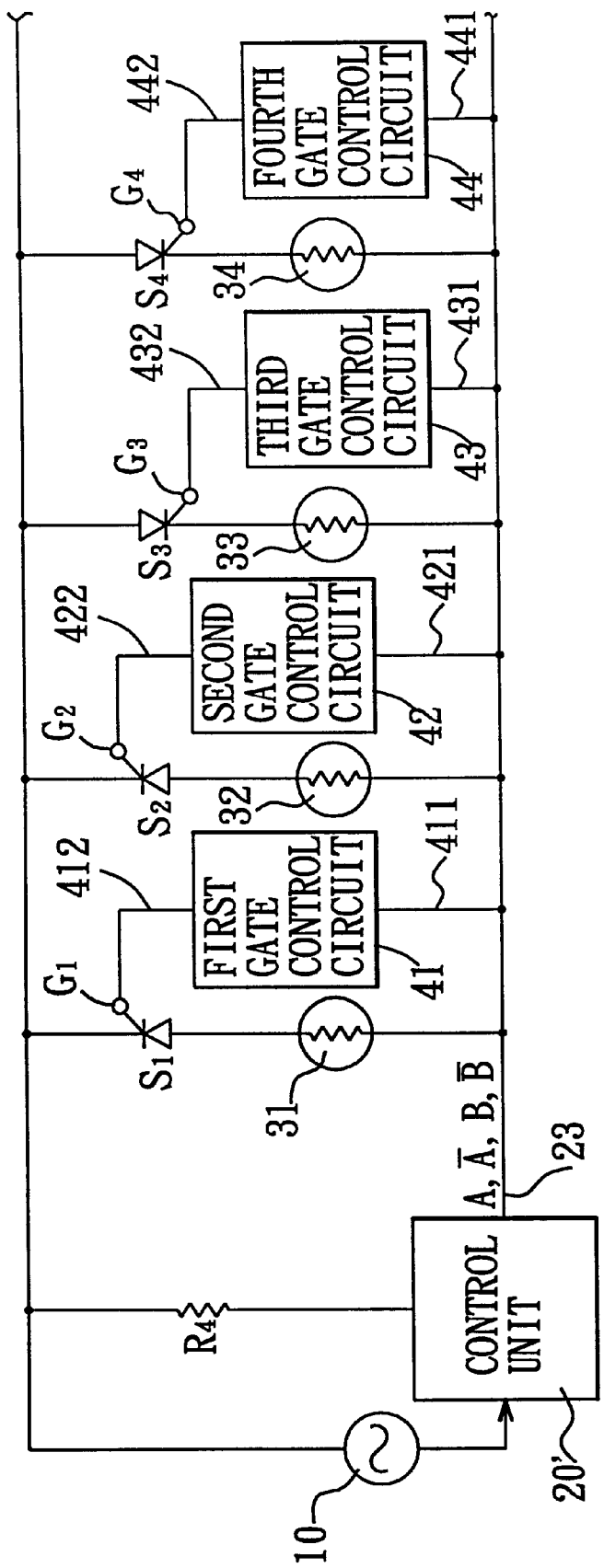
FIG. 7 is a schematic electrical circuit diagram illustrating the fourth preferred embodiment of this invention.

FIG. 7 illustrates the fourth preferred embodiment of a multiplexed lamp assembly according to this invention. Unlike the first preferred embodiment of FIG. 3, the first lamp unit includes the first incandescent lamp 31 coupled to the control line unit 23 of the control unit 20', a first gate-controlled switch (S1) having an anode coupled to the first incandescent lamp 31, a cathode adapted to be coupled the source 10, and a control gate (G1), and a first gate control circuit 41 having an input 411 connected to the control line unit 23, and an output 412 coupled to the control gate (G1) of the first switch (S1). The second lamp unit includes the second incandescent lamp 32 coupled to the control line unit 23 of the control unit 20', a second gate-controlled switch (S2) having an anode coupled to the second incandescent lamp 32, a cathode adapted to be coupled the source 10, and a control gate (G2), and a second gate control circuit 42 having an input 421 connected to the control line unit 23, and an output 422 coupled to the control gate (G2) of the second switch (S2). The third lamp unit includes the third incandescent lamp 33 coupled to the control line unit 23 of the control unit 20', a third gate-controlled switch (S3) having an anode adapted to be coupled to the source 10, a cathode coupled to the third incandescent lamp 33, and a control gate (G3), and a third gate control circuit 43 having an input 431 connected to the control line unit 23, and an output 432 coupled to the control gate (G3) of the third switch (S3). The fourth lamp unit includes the fourth incandescent lamp 34 coupled to the control line unit 23 of the control unit 20', a fourth gate-controlled switch (S4) having an anode adapted to be coupled to the source 10, a cathode coupled to the fourth incandescent lamp 34, and a control gate (G4), and a fourth gate control circuit 44 having an input 441 connected to the control line unit 23, and an output 442 coupled to the control gate (G4) of the fourth switch (S4).

In this embodiment, each of the first, second, third and fourth gate control circuits 41, 42, 43, 44 can be configured to include a flip-flop and a logic circuit so that the first switch (S1) is activated by the first gate control circuit 41 so as to allow current flow from the source 10 through the first incandescent lamp 31 when the control unit 20 generates the first control signal (A) at the control line unit 23 during the first quadrant of a cycle of the alternating current signal (i.e. zero to positive transition), so that the second switch (S2) is activated by the second gate control circuit 42 so as to allow current flow from the source 10 through the second incandescent lamp 32 when the control unit 20 generates the second control signal (B) at the control line unit 23 during the second quadrant of a cycle of the alternating current signal (i.e. positive to zero transition), so that the third switch (S3) is activated by the third gate control circuit 43 so as to allow current flow from the source 10 through the third incandescent lamp 33 when the control unit 20 generates the third control signal ($\overline{A}$) at the control line unit 23 during the third quadrant of a cycle of the alternating current signal (i.e. zero to negative transition), and so that the fourth switch (S4) is activated by the fourth gate control circuit 44 so as to allow current flow from the source 10 through the fourth incandescent lamp 34 when the control unit 20 generates the fourth control signal ($\overline{B}$) at the control line unit 23 during the fourth quadrant of a cycle of the alternating current signal (i.e. negative to zero transition).

It is noted that the control unit of the multiplexed lamp assembly of this invention utilizes no more than two control bus lines for transmission of the first, second, third and fourth control signals to permit multiplexed control of lamp units. The lamp assembly thus requires a lower amount of wire material of fabricate the same. The object of the invention is thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A multiplexed lamp assembly adapted to be coupled to a source of an alternating current signal, comprising:
   a control unit having an input side adapted to be coupled to the source, and an output side with a control line unit, said control unit receiving the alternating current signal and being operable so as to generate first, second, third and fourth control signals at said control line unit, each of the first, second, third and fourth control signals being generated during a respective one of first, second, third and fourth quadrants of a cycle of the alternating current signal; and
   first, second, third and fourth lamp units coupled to said control line unit and adapted to be coupled to the source, each of said first, second, third and fourth lamp units being activated by a respective one of the first, second, third and fourth control signals so as to allow current flow from the source therethrough and emit light during a respective one of the first, second, third and fourth quadrants of the alternating current signal.

2. The multiplexed lamp assembly of claim 1, wherein the first and third quadrants are non-consecutive and the first and third control signals have opposite polarities, and wherein the second and fourth quadrants are non-consecutive and the second and fourth control signals have opposite polarities.

3. The multiplexed lamp assembly of claim 2, wherein said control line unit includes first and second bus lines, said control unit outputting the first and third control signals at said first bus line, and further outputting the second and fourth control signals at said second bus line.

4. The multiplexed lamp assembly of claim 3, wherein each of said first and third lamp units is adapted to be coupled across the source and said first bus line, and each of said second and fourth lamp units is adapted to be coupled across the source and said second bus line.

5. The multiplexed lamp assembly of claim 4, wherein:
   said first lamp unit includes a series connection of a first incandescent lamp and a first diode;
   said second lamp unit includes a series connection of a second incandescent lamp and a second diode;
   said third lamp unit includes a series connection of a third incandescent lamp and a third diode, said third diode being connected to said third incandescent lamp with a polarity opposite to that of said first diode in said first lamp unit; and
   said fourth lamp unit includes a series connection of a fourth incandescent lamp and a fourth diode, said fourth diode being connected to said fourth incandescent lamp with a polarity opposite to that of said second diode in said second lamp unit.

6. The multiplexed lamp assembly of claim 3, wherein said first and third lamp units are in a first series connection that is adapted to be coupled across the source and said first bus line, and said second and fourth lamp units are in a second series connection that is adapted to be coupled across the source and said second bus line.

7. The multiplexed lamp assembly of claim 6, wherein:
   said first lamp unit includes a parallel connection of a first light emitting diode and a first resistor;
   said second lamp unit includes a parallel connection of a second light emitting diode and a second resistor;
   said third lamp unit includes a parallel connection of a third light emitting diode and a third resistor, said third light emitting diode being connected in said third lamp unit with a polarity opposite to that of said first light emitting diode in said first lamp unit; and
   said fourth lamp unit includes a parallel connection of a fourth light emitting diode and a fourth resistor, said fourth light emitting diode being connected in said fourth lamp unit with a polarity opposite to that of said second light emitting diode in said second lamp unit.

8. The multiplexed lamp assembly of claim 6, wherein:
   said first lamp unit includes a parallel connection of a first incandescent lamp and a first diode;
   said second lamp unit includes a parallel connection of a second incandescent lamp and a second diode;
   said third lamp unit includes a parallel connection of a third incandescent lamp and a third diode, said third diode being connected to said third incandescent lamp with a polarity opposite to that of said first diode in said first lamp unit; and
   said fourth lamp unit includes a parallel connection of a fourth incandescent lamp and a fourth diode, said fourth diode being connected to said fourth incandescent lamp with a polarity opposite to that of said second diode in said second lamp unit.

9. The multiplexed lamp assembly of claim 2, wherein each of said first, second, third and fourth lamp units includes:
   an incandescent lamp coupled to said control line unit;
   a gate-controlled switch connected in series to said incandescent lamp and adapted to be coupled to the source, said switch having a control gate; and
   a gate control circuit having an input connected to said control line unit, and an output coupled to said control gate of said switch.

* * * * *